B. D. CHAMBERLIN.
PROCESS AND APPARATUS FOR FEEDING MOLTEN GLASS.
APPLICATION FILED MAY 1, 1916.
1,323,450.
Patented Dec. 2, 1919.
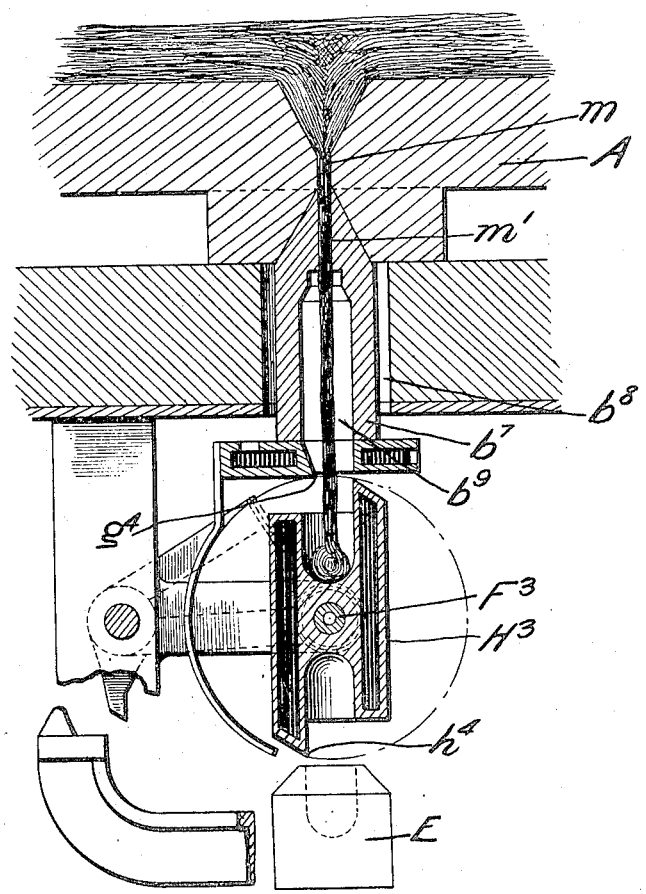

UNITED STATES PATENT OFFICE.

BENJAMIN DAY CHAMBERLIN, OF ROCHESTER, NEW YORK, ASSIGNOR TO EMPIRE MACHINE COMPANY, OF CORNING, NEW YORK, A CORPORATION OF MAINE.

PROCESS AND APPARATUS FOR FEEDING MOLTEN GLASS.

1,323,450.   Specification of Letters Patent.   Patented Dec. 2, 1919.

Original application filed June 2, 1911, Serial No. 630,944. Divided and application filed September 16, 1915, Serial No. 51,031. Divided and this application filed May 1, 1916. Serial No. 94,787.

*To all whom it may concern:*

Be it known that I, BENJAMIN D. CHAMBERLIN, a citizen of the United States of America, and a resident of Rochester, in the county of Monroe and State of New York, have invented certain new and useful Improvements in Processes and Apparatus for Feeding Molten Glass, of which the following is a specification.

This application, which is filed as a division of my prior application #630,944, filed June 2, 1911, and of my other prior application, #51,031, filed September 16, 1915, as a division of the first of aforesaid applications, has for its object to flow glass from a suitable receptacle through an orifice and through a chamber in which is maintained a suitable temperature. In the structure herein shown, the chamber is of larger diameter than the orifice through which the glass flows, so that glass is not in contact with the walls of said chamber, and is made in such a manner that the temperature within it may be maintained sufficiently high to prevent freezing of the glass. In this structure the chamber also terminates at its lower end immediately above a combined mold and shearing mechanism which severs the flowing stream into charges of desired quantities.

My invention consists in the apparatus hereinafter more fully described and claimed, and in the method embodied in the use thereof.

The accompanying drawing in which corresponding parts are designated by similar marks of reference, is a vertical section through a structure embodying my invention.

In these drawings, the part A— may be considered as a furnace structure containing molten glass, and having a discharge orifice M— terminating in a cavity in the lower wall of the furnace. Within this cavity is contained the flow tube $b^7$, the flow tube being smaller than the cavity in which it is contained so that it is surrounded by a space $b^8$. The flow tube has its upper end reduced in diameter and apertured at $m'$ to register with the orifice in the furnace structure, but such upper aperture is smaller than the central cavity formed in the lower end of the tube which is enlarged to form a chamber $b^9$. The top of the chamber forms a square shoulder surrounding the outlet end of the aperture $m'$, and thus the chamber is of greater diameter than the glass stream.

The lower end of the flow tube terminates in a suitable water-cool casting, one edge of which is formed into a shear element, while a coöperating shear member $H^3$ is mounted upon the shaft $F^3$ immediately below such tube. By preference, this last named shear member is water-cooled, and has opposing cavities therein, and has a cutting edge $h^4$ adjacent to one side of each of the cavities. In practice, the cutting member is intermittently rotated, and allowed to rest with one of its cavities below the chamber $b^9$. It is so timed that when a proper quantity of the glass has accumulated in the cavity, it will be given a movement through an arc of 180°, thus shearing the stream flowing downwardly from within the chamber, and depositing such charge in one of a suitable series of molds E, located below its pivotal point. This motion will also bring the other mold cavity beneath the chamber $b^9$.

The temperature of the space $b^8$ around the flow tube can be controlled and can be raised sufficiently high to prevent freezing of the glass within the chamber $b^9$. In practice, not only will the temperature within the chamber of the flow tube be raised by the temperature of the space surrounding such tube, but the heated stream of glass will, in itself, raise the temperature of the air within such chamber, especially as its upper end is closed and there are thus no air currents flowing in the chamber to reduce its temperature, or to cause local variations in the temperature of the flowing stream. It will also be noted that the severing point of the glass is at such a point that the glass stream is not cooled prior to the severing.

Having thus described my invention what I claim, and desire to secure by Letters Patent is:—

1. The combination with a molten glass receptacle having a discharge orifice, of an auxiliary chamber surrounding said orifice whose top is closed, except for such orifice, severing and gather collecting means located immediately below the bottom of the said chamber, and at least partially closing the same, said chamber maintaining a quiescent heated gas envelop around the glass.

2. A molten glass receptacle having a free flow discharge orifice in combination with an auxiliary chamber below said orifice into which said orifice directly discharges by gravity and of sufficient diameter for its walls to be normally out of contact with the glass discharging from said orifice, movable means to support the bottom of successive gobs of glass during their accumulation, said means when in supporting position partially closing the bottom of the chamber, and actuating mechanism for said means.

3. A molten glass receptacle having a free flow discharge orifice, in combination with an auxiliary chamber below said orifice into which said orifice directly discharges by gravity, and of sufficient diameter for its walls to be normally out of contact with the glass discharged from said orifice, movable means in which glass is supported and accumulated, said means when in supporting position partially closing the bottom of the chamber, and actuating mechanism for said means.

4. The combination with a molten glass receptacle having a discharge orifice, a chamber surrounding said orifice and having its top substantially closed except for such orifice, whereby a heated quiescent gaseous envelop is maintained around the glass, and means for severing into charges the glass issuing from said chamber.

5. The method of feeding molten glass, which consists in the flowing of glass from a surrounding heated quiescent atmosphere and periodically cutting molded charges from the glass immediately upon issuance from the said atmosphere.

6. The combination with a molten glass receptacle having a discharge orifice, of an auxiliary chamber surrounding said orifice and substantially closed at the top except for such orifice, and means located immediately below the bottom of said chamber for severing the glass issuing therefrom into charges.

BENJAMIN DAY CHAMBERLIN.